United States Patent
Oike

(10) Patent No.: US 8,500,091 B2
(45) Date of Patent: Aug. 6, 2013

(54) OPENING AND CLOSING VALVE INCLUDING A PACKING GLAND AND A YOLK SLEEVE

(75) Inventor: Tadashi Oike, Hyogo-ken (JP)

(73) Assignee: TLV Co., Ltd., Kakogawa-shi (JP)

(*) Notice: Subject to any disclaimer, the term of this patent is extended or adjusted under 35 U.S.C. 154(b) by 256 days.

(21) Appl. No.: 12/959,818

(22) Filed: Dec. 3, 2010

(65) Prior Publication Data
US 2011/0140021 A1   Jun. 16, 2011

(30) Foreign Application Priority Data
Dec. 16, 2009   (JP) .................................. 2009-285182

(51) Int. Cl.
*F16K 41/02*   (2006.01)

(52) U.S. Cl.
USPC ........ 251/214; 251/335.3; 251/367; 277/520; 277/527

(58) Field of Classification Search
USPC ............... 251/214, 335.3, 367; 277/520–522, 277/524, 527
See application file for complete search history.

(56) References Cited

U.S. PATENT DOCUMENTS

| | | | | |
|---|---|---|---|---|
| 2,555,262 A | * | 5/1951 | Weinberg | 251/214 |
| 2,744,775 A | * | 5/1956 | Bredtschneider | 277/520 |
| 3,504,888 A | * | 4/1970 | Haines et al. | 251/214 |
| 4,061,157 A | * | 12/1977 | Hanssen | 251/214 |
| 4,356,832 A | * | 11/1982 | Velan | 251/214 |
| 4,773,442 A | * | 9/1988 | Lephilibert | 251/214 |
| 5,454,547 A | * | 10/1995 | Brown | 251/214 |
| 5,743,288 A | * | 4/1998 | Mosman et al. | 251/214 |

FOREIGN PATENT DOCUMENTS

JP   2003004165   *   1/2003

* cited by examiner

*Primary Examiner* — John Bastianelli
(74) *Attorney, Agent, or Firm* — Kenyon & Kenyon LLP

(57) ABSTRACT

A valve stem is journaled in a journaling portion of a valve box in an upwardly and downwardly movable manner; a packing is interposed between the journaling portion and the valve stem; a packing gland is arranged above the packing; a yoke sleeve is provided above the packing gland; and a valve seat in the valve box is opened and closed with a valve element provided at the lower end of the valve stem by rotating a handle fitted into the yoke sleeve to move the valve stem upward and downward. A protective tube formed integrally with the packing gland is provided between the packing gland and the yoke sleeve around the valve stem. A guide projection with which the inner periphery of the upper end of the protective tube comes into contact is provided on the lower surface of the yoke sleeve.

1 Claim, 6 Drawing Sheets

US 8,500,091 B2

OPENING AND CLOSING VALVE INCLUDING A PACKING GLAND AND A YOLK SLEEVE

BACKGROUND OF THE INVENTION

The present invention relates to an opening and closing valve which opens and closes a valve seat in a valve box by a valve element provided at a lower end of a valve stem by moving the valve stem upward and downward.

In an opening and closing valve for controlling the flow of high-pressure fluids and corrosive fluids, a packing is interposed between a journaling portion of a valve box and a valve stem in order to prevent the fluids from leaking to the outside. Japanese Utility Model Publication No. H3-77880 discloses, for example, an opening and closing valve in which a packing gland which presses the packing is provided via a packing gland ring above the packing interposed between the journaling portion of the valve box and the valve stem; a yoke sleeve inserted into a yoke portion of the valve box and screwed into the valve stem is provided above the packing gland and; and the opening and closing valve opening and closing a valve seat in a valve box by a valve element provided at a lower end of the valve stem by moving the valve stem upward and downward by rotating a handle fitted into the yoke sleeve.

SUMMARY OF THE INVENTION

In conventional opening and closing valves as mentioned above, there are the problems that, when dust, scale, rain water, salt water and other foreign substances get into a space between the valve stem and the yoke sleeve and packing gland, the displacement resistance of the valve stem increases; and smooth upward and downward movement of the valve stem is prevented. Foreign substances can be prevented from getting into a space between the valve stem and the yoke sleeve and packing gland if there is no a gap between the upper surface of the packing gland and the lower surface of the yoke sleeve, but lowering the packing gland to retighten the packing when the sealing property of the packing is lowered due to abrasion, deterioration and for other reasons produces a gap between the upper surface of the packing gland and the lower surface of the yoke sleeve.

It is therefore an object of the present invention to provide an opening and closing valve in which no gap between the upper surface of the packing gland and the lower surface of the yoke sleeve is produced even when the packing gland is lowered.

To achieve the above-mentioned object, the opening and closing valve of the present invention comprises a valve stem journaled on a journaling portion of a valve box in an upwardly and downwardly movable manner, a packing interposed between the journaling portion of the valve box and the valve stem, a packing gland provided above the packing to press the packing, and a yoke sleeve provided above the packing gland, inserted into a yoke portion of the valve box and screwed into the valve stem, the opening and closing valve opening and closing the valve seat in the valve box with a valve element provided at a lower end of the valve stem by rotating a handle fitted into the yoke sleeve to move the valve stem upward and downward, a protective tube being provided between the packing gland and the yoke sleeve around the valve stem, a guide projection or a guide recess with which the inner or outer periphery of the upper end of the protective tube comes into contact being provided on the lower surface of the yoke sleeve or/and a guide projection or a guide recess with which the inner or outer periphery of the lower end of the protective tube comes into contact being provided on the upper surface of the packing gland.

In the present invention, the opening and closing valve may be so constructed that the protective tube is formed integrally with the packing gland and the guide projection or the guide recess with which the inner or outer periphery of the upper end of the protective tube comes into contact is provided on the lower surface of the yoke sleeve, the protective tube is formed integrally with the yoke sleeve and the guide projection or guide recess with which the inner or outer periphery of the lower end of the protective tube comes into contact is provided on the upper surface of the packing gland, and that the protective tube is formed separately from the packing gland and the yoke sleeve and the guide projection or guide recess with which the inner or outer periphery of the upper end of the protective tube comes into contact is provided on the lower surface of the yoke sleeve, while the guide projection or guide recess with which the inner or outer periphery of the lower end of the protective tube comes into contact is provided on the upper surface of the packing gland.

According to the present invention, since the protective tube is provided between the packing gland and the yoke sleeve around the valve stem; the guide projection or guide recess with which the inner or outer periphery of the upper end of the protective tube comes into contact is provided on the lower surface of the yoke sleeve; or/and the guide projection or guide recess with which the inner or outer periphery of the lower end of the protective tube comes into contact is provided on the upper surface of the packing gland, even when the packing gland is lowered to retighten the packing, the state that the inner or outer periphery of the upper end of the protective tube is in contact with the guide projection or guide recess of the yoke sleeve or/and the state that the inner or outer periphery of the lower end of the packing gland is in contact with the guide projection or guide recess can be maintained. This effectively prevents the formation of a gap between the upper surface of the packing gland and the lower surface of the yoke sleeve.

DETAILED DESCRIPTION OF THE INVENTION

Figure 1:
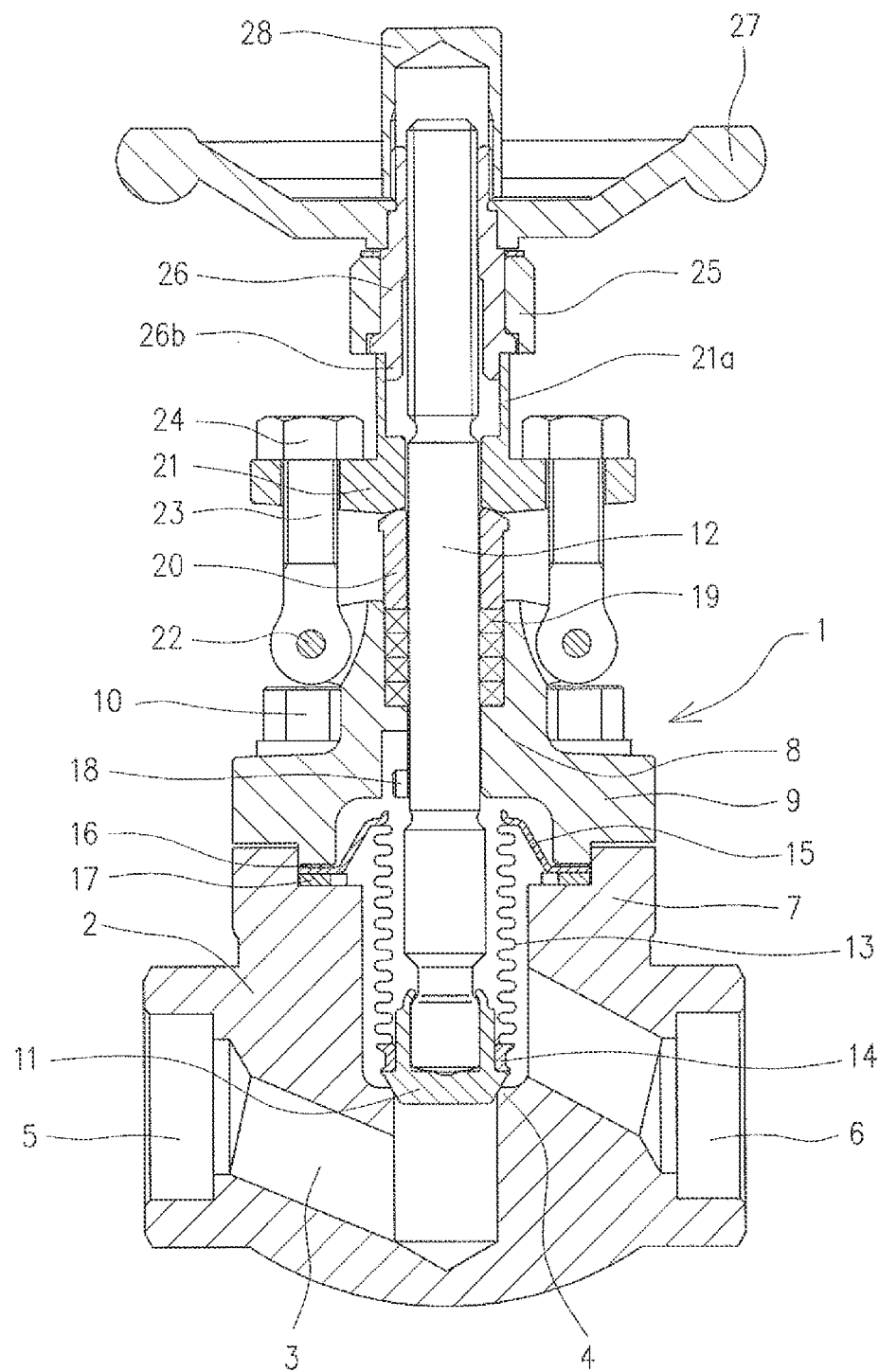
FIG. 1 is a cross-sectional view of an opening and closing valve according to an embodiment of the present invention.

An embodiment of the invention will be described with reference to FIG. 1. FIG. 1 shows the application of an opening and closing valve of the present invention to a glove valve. A valve box 2 of a glove valve 1 has thereinside a channel 3 for fluid, an approximately horizontal annular valve seat 4 formed at the center of the channel 3, pipe connection portions 5 and 6 formed at both ends of the channel 3 and to which pipes (not illustrated) are connected, and a connecting flange 7 formed at an upper end portion thereof. A connecting flange 9 formed at the lower end of a journaling portion 8 of the valve box is fastened onto the connecting flange 7 of the valve box 2 with a bolt 10.

A valve stem 12 provided with a valve element 11 which opens and closes the valve seat 4 is journaled in the journaling portion 8 of the valve box in an upwardly and downwardly movable manner. The valve element 11 is fixed onto the lower end of the valve stem 12 by fitting a recess in its upper part onto the lower end of the valve stem and crimping the upper end of the recess. A metallic bellows 13 is provided in a manner of surrounding the outer periphery of the lower end of the valve stem 12. A bellows ring 14 welded to the valve element 11 is fixed onto the lower end of the metallic bellows 13, while a bellows flange 15 is fixed onto the upper end of the bellows 13 by welding. The bellows flange 15 is nipped vertically between the valve box 2 and the journaling portion 8 of the valve box at its outer periphery via gaskets 16 and 17. A pin 18 is provided above the metallic bellows 13 of the valve stem 12 to prevent its rotation.

A packing 19 is interposed between the journaling portion 8 of the valve box and the valve stem 12, and a packing gland 21 which presses the packing 19 is provided above the packing 19 via a packing gland ring 20. The packing 19 is compressed by fastening the packing gland 21 with an eyebolt 23 whose one end is supported on the journaling portion 8 of the valve box by an eyebolt pin 22 and an eyebolt nut 24.

A yoke sleeve 26 inserted into a yoke portion 25 of the valve box and screwed into the valve stem 12 is provided above the packing gland 21. By fitting a handle 27 and fastening a box nut 28 onto an upper part of the yoke sleeve 26, the handle 27 is coupled to the valve stem 12 integrally. By rotating the handle 27 to move the valve stem 12 upward and downward, the valve seat 4 is opened and closed with the valve element 11. By covering the upper end of the valve stem 12 with the box nut 28, foreign substances can be prevented from getting into a space between the valve stem 12 and the yoke sleeve 26 from the upper end side of the valve stem 12.

A protective tube 21a formed integrally with the packing gland 21 is provided between the packing gland 21 and the yoke sleeve 26 around the valve stem 12. A guide projection 26b with which the inner periphery of the upper end of the protective tube 21a comes into contact is provided on the lower surface of the yoke sleeve 26. Even when the eyebolt nut 24 is screwed to retighten the packing 19 and lower the packing gland 21, the state that the inner periphery of the upper end of the protective tube 21a is in contact with the outer periphery of the guide projection 26b can be maintained, and therefore no gap is produced between the upper surface of the packing gland 21 and the lower surface of the yoke sleeve 26.

Figure 2:
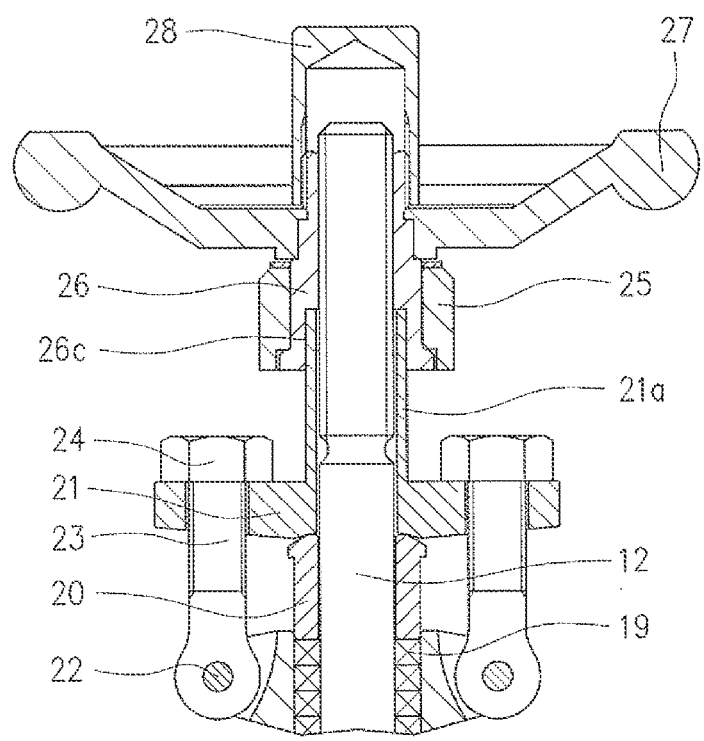
FIG. 2 is a cross-sectional view of an important part of an opening and closing valve according to another embodiment of the present invention.

Another embodiment of the present invention will be described with reference to FIGS. 2 to 6. In the following embodiments, the components which correspond to those in FIG. 1 are denoted by the same numerals as in FIG. 1, and their explanation is omitted. In FIG. 2, A guide recess 26c with which the outer periphery of the upper end of a protective tube 21a formed integrally with a packing gland 21 comes into contact is provided on the lower surface of a yoke sleeve 26. Even when an eyebolt nut 24 is screwed to retighten a packing 19 and lower the packing gland 21, the state that the outer periphery of the upper end of the protective tube 21a is in contact with the inner periphery of the guide recess 26c, and therefore no gap is produced between the upper surface of the packing gland 21 and the lower surface of the yoke sleeve 26.

Figure 3:
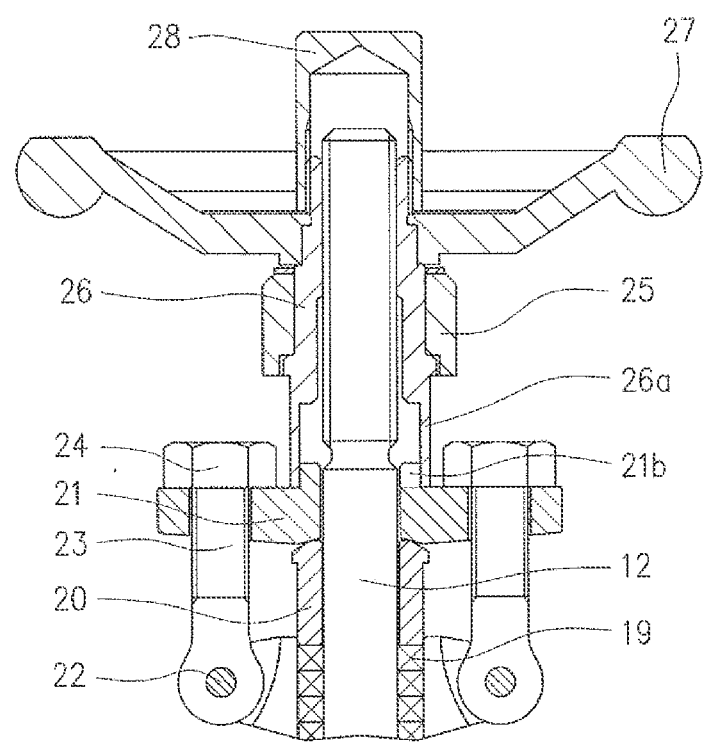
FIG. 3 is a cross-sectional view of an important part of an opening and closing valve according to another embodiment of the present invention.

In FIG. 3, A protective tube 26a formed integrally with a yoke sleeve 26 is provided between a packing gland 21 and a yoke sleeve 26 around a valve stem 12. A guide projection 21b with which the inner periphery the lower end of the protective tube 26a comes into contact is provided on the upper surface of the packing gland 21. Even when an eyebolt nut 24 is screwed to retighten a packing 19 and lower the packing gland 21, the state that the inner periphery of the lower end of the protective tube 26a is in contact with the outer periphery of the guide projection 21b can be maintained, and therefore no gap is produced between the upper surface of the packing gland 21 and the lower surface of the yoke sleeve 26.

Figure 4:
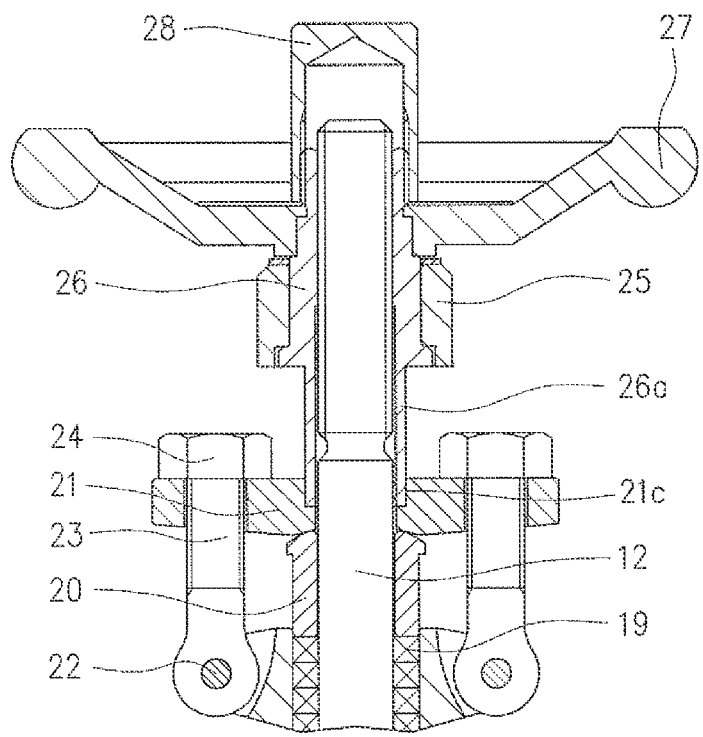
FIG. 4 is a cross-sectional view of an important part of an opening and closing valve according to another embodiment of the present invention.

In FIG. 4, a guide recess 21c with which the outer periphery of the lower end of a protective tube 26a formed integrally with a yoke sleeve 26 comes into contact is provided on the upper surface of a packing gland 21. Even when an eyebolt nut 24 is screwed to retighten a packing 19 and lower the packing gland 21, the state that the outer periphery of the lower end of the protective tube 26a is in contact with the inner periphery of the guide recess 21c can be maintained, and therefore no gap is produced between the upper surface of the packing gland 21 and the lower surface of the yoke sleeve 26.

Figure 5:
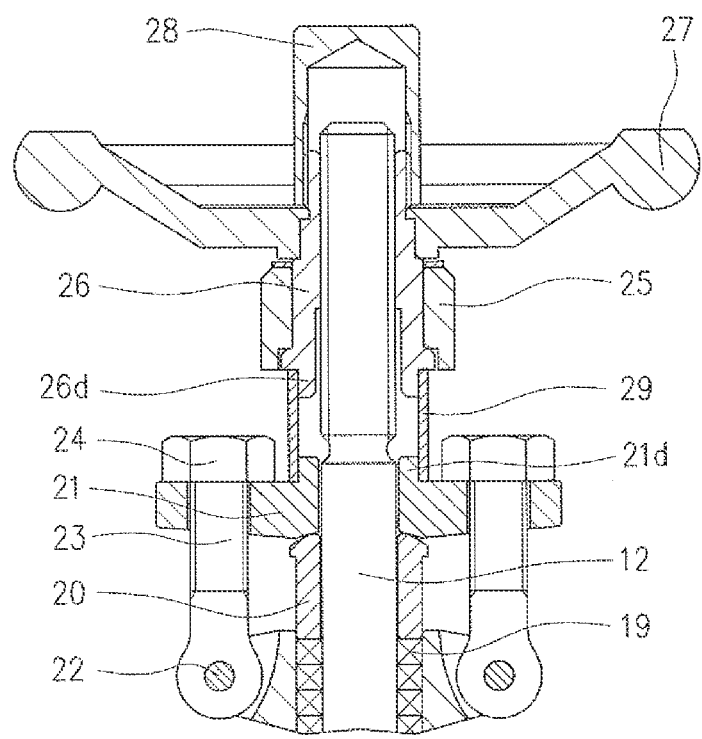
FIG. 5 is a cross-sectional view of an important part of an opening and closing valve according to another embodiment of the present invention.

In FIG. 5, a packing gland 21 and a protective tube 29 formed separately from a yoke sleeve 26 are provided between the packing gland 21 and the yoke sleeve 26 around a valve stem 12. A guide projection 21d with which the inner periphery of the lower end of the protective tube 29 comes into contact is provided on the upper surface of the packing gland 21, while a guide projection 26d with which the inner periphery of the upper end of the protective tube 29 comes into contact is provided on the lower surface of the yoke sleeve 26. Even when an eyebolt nut 24 is screwed to retighten a packing 19 and lower the packing gland 21, the state that the inner periphery of the lower end of the protective tube 29 is in contact with the outer periphery of the guide projection 21d and the inner periphery of the upper end is in contact with the outer periphery of the guide projection 26d can be maintained, and therefore no gap is produced between the upper surface of the packing gland 21 and the lower surface of the yoke sleeve 26. The materials of the protective tube 29 are not particularly limited, but metals, synthetic resins, synthetic rubbers and other materials can be used. The protective tube 29 may also have such a shape that has a notch in its longitudinal direction as far as it can prevent foreign substances from getting into the space.

Figure 6:
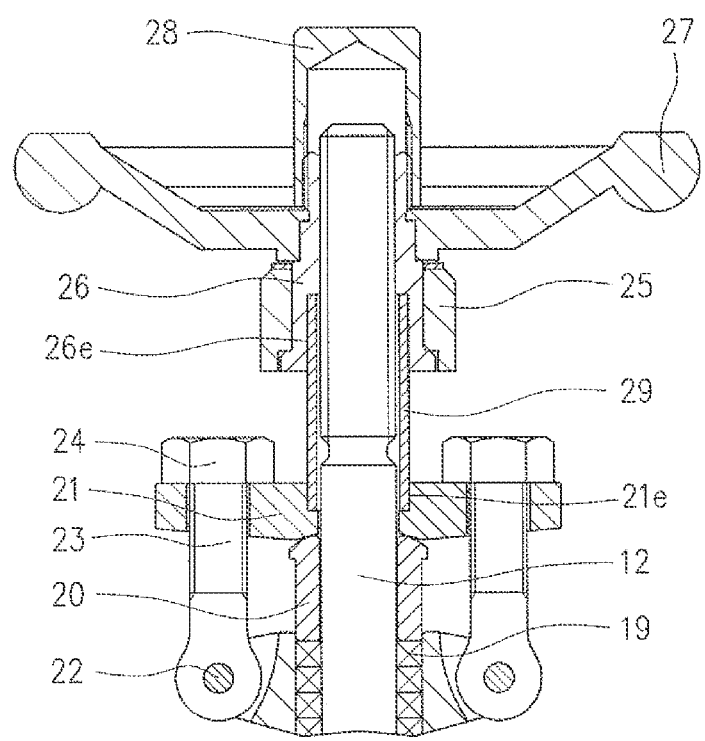
FIG. 6 is a cross-sectional view of an important part of an opening and closing valve according to another embodiment of the present invention.

In FIG. 6, a packing gland 21 and a guide recess 21e with which the outer periphery of the lower end of a protective tube 29 formed separately from a yoke sleeve 26 comes into contact are provided on the upper surface of the packing gland 21, while a guide recess 26e with which the upper end outer periphery of the protective tube 29 comes into contact is provided on the lower surface of the yoke sleeve 26. Even when an eyebolt nut 24 is screwed to retighten a packing 19 and lower the packing gland 21, the state that the outer periphery of the lower end of the protective tube 29 is in contact with the inner periphery of the guide recess 21e and its upper end outer periphery is in contact with the inner periphery of the guide recess 26e can be maintained, and therefore no gap is produced between the upper surface of the packing gland 21 and the lower surface of the yoke sleeve 26. The materials of the protective tube 29 are not particularly limited, but metals, synthetic resins, synthetic rubbers and other materials can be used. The protective tube 29 may have such a shape that has a notch in its longitudinal direction as long as it can prevent foreign substances from getting into the space.

The movement of the glove valve mentioned above is as follows: By rotating the handle 27 in a predetermined direction from the state that the valve is closed as illustrated to elevate the valve stem 12, the valve element 11 is detached from the valve seat 4 and the fluid channel 3 of the valve box 2 is opened, so that the fluid flows from the pipe connection portion 5 side to the pipe connection portion 6 side. When the handle 27 is rotated in the direction opposite to that mentioned above to lower the valve stem 12 to the position shown in the FIG., the valve element 11 is set on the valve seat 4 so that the fluid channel 3 of the valve box 2 is closed and the flow of the fluid is blocked.

INDUSTRIAL APPLICABILITY

The present invention can be used not only for the above-mentioned glove valve, but also gate valves, needle valves, plug valves and various other kinds of valves as far as it is an opening and closing valve in which the valve seat is opened and closed with the valve element by moving the valve stem upward and downward.

What is claimed is:
1. An opening and closing valve comprising:
a valve stem journaled on a journaling portion of a valve box in an upwardly and downwardly movable manner,
a packing interposed between the journaling portion of the valve box and the valve stem,
a packing gland provided above the packing to press the packing,
a yoke sleeve provided above the packing gland, inserted into a yoke portion of the valve box and screwed into the valve stem, the opening and closing valve opening and closing a valve seat in the valve box with a valve element provided at a lower end of the valve stem by rotating a handle fitted into the yoke sleeve to move the valve stem upward and downward,
a protective tube being provided between and formed separately from the packing gland and the yoke sleeve around the valve stem,
a first guide projection or a first guide recess with which the inner or outer periphery of the upper end of the protective tube comes into contact being provided on the lower surface of the yoke sleeve, and a second guide projection or a second guide recess with which the inner or outer periphery of the lower end of the protective tube comes into contact being provided on the upper surface of the packing gland.

* * * * *